US008675339B2

(12) United States Patent  
Kauffman (10) Patent No.: US 8,675,339 B2  
(45) Date of Patent: Mar. 18, 2014

(54) FEEDTHROUGH CAPACITOR (76) Inventor: George M. Kauffman, Hudson, MA (US)

( * ) Notice: Subject to any disclaimer, the term of this patent is extended or adjusted under 35 U.S.C. 154(b) by 110 days.

(21) Appl. No.: 13/466,495

(22) Filed: May 8, 2012

(65) Prior Publication Data

US 2012/0293910 A1 Nov. 22, 2012

Related U.S. Application Data (60) Provisional application No. 61/519,151, filed on May 17, 2011.

(51) Int. Cl.
*H01G 4/35* (2006.01)

(52) U.S. Cl.
USPC ........ 361/302; 361/303; 361/305; 361/306.1; 361/306.3; 361/311; 333/183; 333/184; 333/185; 333/167

(58) Field of Classification Search
USPC ................ 361/302, 303, 305, 306.1, 306.3, 361/311–313; 333/183, 184, 185, 167
See application file for complete search history.

(56) References Cited

U.S. PATENT DOCUMENTS

| | | | | |
|---|---|---|---|---|
| 5,406,444 A | * | 4/1995 | Selfried et al. | 361/302 |
| 5,546,058 A | * | 8/1996 | Azuma et al. | 333/183 |
| 6,453,551 B1 | * | 9/2002 | Nordquist et al. | 29/862 |
| 6,519,133 B1 | * | 2/2003 | Eck et al. | 361/302 |
| 7,281,305 B1 | * | 10/2007 | Iyer et al. | 29/25.42 |
| 8,526,162 B2 | * | 9/2013 | Togashi et al. | 361/302 |

* cited by examiner

Primary Examiner — Nguyen T Ha  
(74) Attorney, Agent, or Firm — Kriegsman & Kriegsman (57) ABSTRACT A feedthrough capacitor includes an inner electrode that extends coaxially within a grounded outer electrode. A non-conductive, epoxy-based potting material insulates and adhesively joins opposing roughened portions of the inner and outer electrodes. A capacitor assembly extends between the inner and outer electrode and serves to bypass relatively high frequency signals carried by the inner electrode to the grounded outer electrode. The capacitor assembly includes a plurality of monolithic multilayer ceramic capacitors, each capacitor having first and second terminals that are respectively surface mounted onto inner and outer concentric conductive rings. A plurality of deflectable tines project radially inward from the inner ring and resiliently circumferentially contact the exterior of the inner electrode. Similarly, a plurality of deflectable tines project radially outward from the outer ring and resiliently circumferentially contact the interior of the outer electrode.

20 Claims, 5 Drawing Sheets

FEEDTHROUGH CAPACITOR

CROSS-REFERENCE TO RELATED APPLICATIONS

The present application claims the benefit of U.S. Provisional Patent Application Ser. No. 61/519,151, which was filed on May 17, 2011 in the name of George M. Kauffman, the disclosure of which is incorporated herein by reference.

FIELD OF THE INVENTION

The present invention relates generally to electromagnetic devices and, more particularly, to feedthrough capacitors.

BACKGROUND OF THE INVENTION

A feedthrough capacitor is a limited inductance conductor with a known threshold of capacitance that is typically used to carry a signal through the grounded metal chassis, or panel, of an electronic component. In the art, feedthrough capacitors are commonly incorporated into power supply leads for electronic components with high frequency circuitry. In this application, the feedthrough capacitor is designed to deliver DC or lower frequency alternating current (AC) signals to the electronic component while, at the same time, bypassing relatively high frequency alternating current (AC) signals, such relatively high radio frequency (RF) energy, to the grounded metal chassis. In this capacity, the feedthrough capacitor acts as a very low inductance filter that prevents the potentially harmful, high frequency AC signals from being transferred into or out of the electronic equipment along the power supply lead.

A feedthrough capacitor traditionally comprises a capacitor through which a lead, or center electrode, is passed, the lead being conductively coupled to one terminal of the capacitor. The other terminal of the capacitor is typically conductively coupled to a collar-shaped housing, or outer electrode, that is in turn transversely mounted within a fitted opening formed in the metal chassis. As such, relatively high frequency electrical energy carried by the lead is diverted by the capacitor to the grounded metal chassis by means of the outer electrode.

In the art, the particular design of the capacitor through which the lead is passed often varies considerably both in its overall geometry, or style, as well as its dielectric material composition.

For instance, one type of feedthrough capacitor which is well-known in the art utilizes a tubular ceramic capacitor. Specifically, a hollow, ceramic tube is utilized as the dielectric material, the inner and outer surfaces of the tube being metalized. In this manner, the capacitance of the tubular ceramic capacitor is largely defined by the thickness, diameter and dielectric properties of the ceramic material. To complete manufacture of the feedthrough capacitor, an inner, or through, electrode is coaxially passed through the longitudinal bore defined by the capacitor and is conductively coupled to its metalized inner surface. Finally, an outer mounting collar, or outer electrode, is coaxially disposed over the ceramic tube and is soldered or otherwise conductively coupled to its metalized outer surface.

Another type of feedthrough capacitor which is well-known in the art utilizes a discoidal ceramic capacitor. Specifically, an annular ceramic body is formed with metallized inner and outer surfaces. Similar to a tubular capacitor, the inner surface of a discoidal capacitor is conductively coupled to a lead passed therethrough and the outer surface of a discoidal capacitor is conductively coupled to collar-shaped housing that is adapted for mounting within a metal chassis. As a unique part of its internal construction, a discoidal ceramic capacitor includes multiple, spaced apart, overlapping metal layers that alternately connect to the inner and outer metallized surfaces. The inclusion of the overlapping metal layers significantly increases the total surface area between opposing metal surfaces, thereby rendering discoidal ceramic capacitors with a higher capacitance per unit volume construction than tubular ceramic capacitors.

Although well-known in the art, feedthrough capacitors of the type as described above that rely upon a ceramic dielectric material have been found to suffer from a few notable shortcomings.

As a first shortcoming, ceramic materials are inherently fragile by nature. Because both tubular and discoidal ceramic capacitors rely upon the ceramic dielectric for significant structural support, it has been found that the ceramic dielectric in each design is rendered highly susceptible to cracking, fragmentation or the like. In particular, irreversible damage to the ceramic dielectric is often caused from forces applied thereto during routine assembly and installation of the feedthrough capacitor as well as from exposure to changes in temperature.

As a second shortcoming, it has been found to be rather difficult to construct ceramic-type feedthrough capacitors in larger form factors. As a result, the capacitance of most ceramic-type capacitors is rather limited. Furthermore, due to the aforementioned size restrictions, the diameter of the capacitor through hole (i.e., the hole through which the lead is passed) is generally limited. Consequently, the size of the center electrode that passes through the capacitor is similarly restricted, thereby limiting its current carrying capability.

In view of the aforementioned shortcomings associated with feedthrough capacitors that rely upon a ceramic-based dielectric, feedthrough capacitors are also commonly constructed using a dielectric film constructed from one or more layers of a polymer material, a paper material, or a composite thereof. As part of its manufacture, the opposing faces of the dielectric film are applied with a metal, such as aluminum. The resultant dielectric film is then wound around a hollow insulating tube, or other similar structure, to enable the lead to pass therethrough.

Feedthrough capacitors that rely upon a polymer and/or paper-based dielectric film have been found to be desirable in that a relatively high capacitance level and high voltage carrying capabilities can be obtained. However, at the same time, the use of a polymer and/or paper-based dielectric film has been found to be subject to numerous performance disadvantages including, but not limited to, a considerable sensitivity to high temperature environments as well as a significant size requirement that limits its use in smaller applications.

BRIEF SUMMARY OF THE INVENTION

It is an object of the present invention to provide a new and improved feedthrough capacitor.

It is another object of the present invention to provide a new and improved feedthrough capacitor that includes a capacitive structure through which a lead is passed.

It is yet another object of the present invention to provide a feedthrough capacitor as described above that includes a capacitive structure with a capacitance that is relatively high and accurately determinable.

It is still another object of the present invention to provide a feedthrough capacitor as described above that is highly durable in nature and readily able to withstand significant physical forces as well as exposure to substantial changes in temperature.

It is yet still another object of the present invention to provide a feedthrough capacitor as described above that can be constructed without significant size restrictions.

Accordingly, as a principal feature of the present invention, there is provided a feedthrough device comprising (a) a grounded outer electrode shaped to define an enlarged interior cavity, (b) an inner electrode extending through the outer electrode, the inner electrode being adapted to carry electric current, (c) a dielectric material disposed between the outer and inner electrodes, and (d) a capacitor assembly for bypassing electric current carried by the inner electrode that falls above a predefined threshold to the grounded outer electrode, the capacitor assembly comprising (i) one or more capacitors, each capacitor having a first terminal and a second terminal, (ii) a first array of spring fingers conductively coupled to the first terminal of each of the one or more capacitors, the first array of spring fingers being conductively coupled to the outer electrode, and (iii) a second array of spring fingers conductively coupled to the second terminal of each of the one or more capacitors, the second array of spring fingers being conductively coupled to the inner electrode.

As another feature of the present invention, there is provided a feedthrough device comprising (a) a grounded outer electrode shaped to define an enlarged interior cavity, (b) an inner electrode extending through the outer electrode, the inner electrode being adapted to carry electric current, (c) a dielectric material disposed between the outer and inner electrodes, and (d) a capacitor assembly for bypassing electric current carried by the inner electrode that falls above a predefined threshold to the grounded outer electrode, the capacitor assembly comprising (i) one or more capacitors, each capacitor having a first terminal and a second terminal, and (ii) a first array of spring fingers for conductively coupling one of the first and second terminals of each of the one or more capacitors to one of the outer and inner electrodes.

As another feature of the present invention, there is provided a device comprising (a) a grounded outer electrode having an outer surface and an inner surface, the outer electrode being shaped to define an enlarged interior cavity and a narrow longitudinal bore that extends in communication with the enlarged interior cavity, (b) an inner electrode extending through the outer electrode, the inner electrode being adapted to carry electric current, and (c) a dielectric material disposed between the outer and inner electrodes, (d) wherein the portion of the inner surface of the outer electrode that immediately defines the longitudinal bore includes a region with opposing left and right hand grooves that crisscross to form a diamond-like pattern.

Various other features and advantages will appear from the description to follow. In the description, reference is made to the accompanying drawings which form a part thereof, and in which is shown by way of illustration, various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF THE INVENTION

Figure 1:
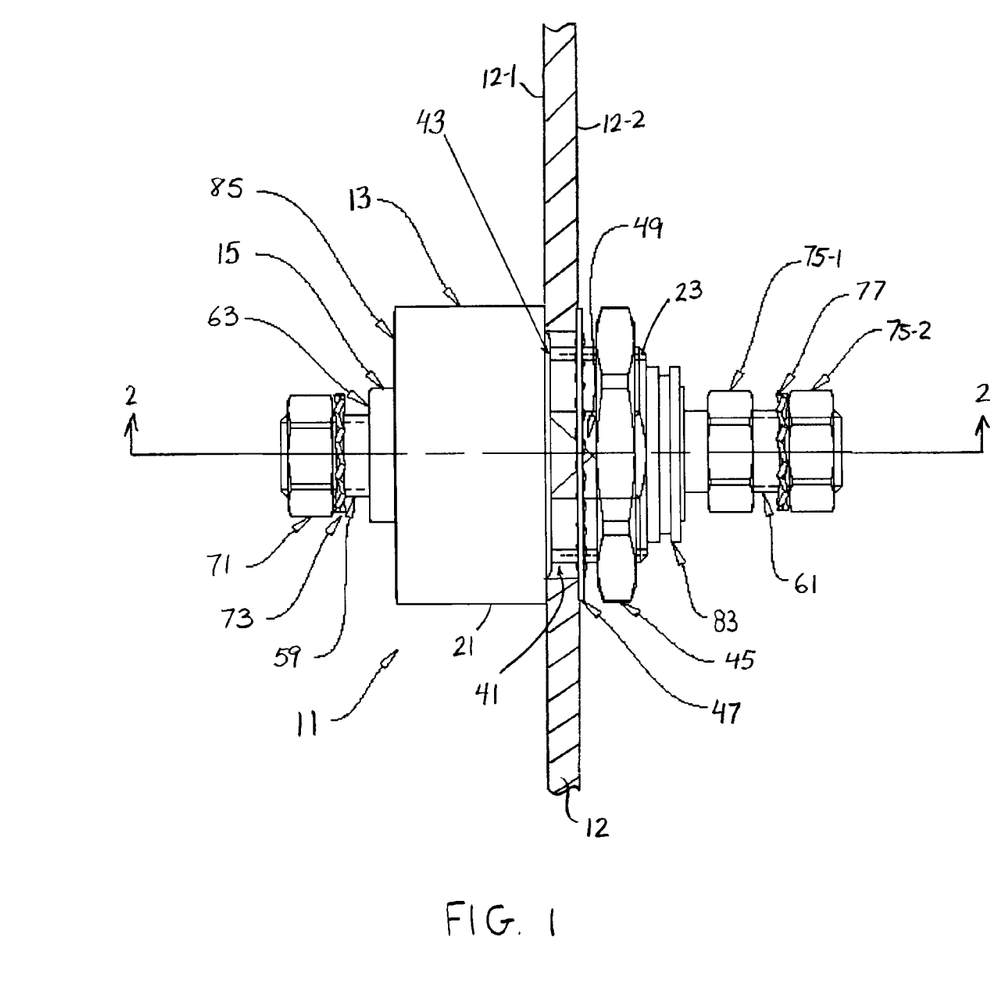
FIG. 1 is a top view of a first embodiment of a feedthrough capacitor constructed according to the teachings of the present invention, the feedthrough capacitor being shown mounted in and extending through the grounded metal chassis of an electronic component, the chassis being shown in fragmentary, section form.

Referring now to FIG. 1, there is shown a first embodiment of a feedthrough capacitor constructed according to the teachings of the present invention, the feedthrough capacitor being identified generally by reference numeral 11. In use, feedthrough capacitor 11 is adapted to be mounted in and extend through a grounded metal chassis 12 of an electronic component. Mounted as such, feedthrough capacitor 11 can be used to deliver direct current (DC) or relatively low frequency alternating current (AC) signals to the electronic component while, at the same time, bypassing relatively high frequency AC signals, such relatively high radio frequency (RF) energy, to grounded metal chassis 12.

Figure 2:
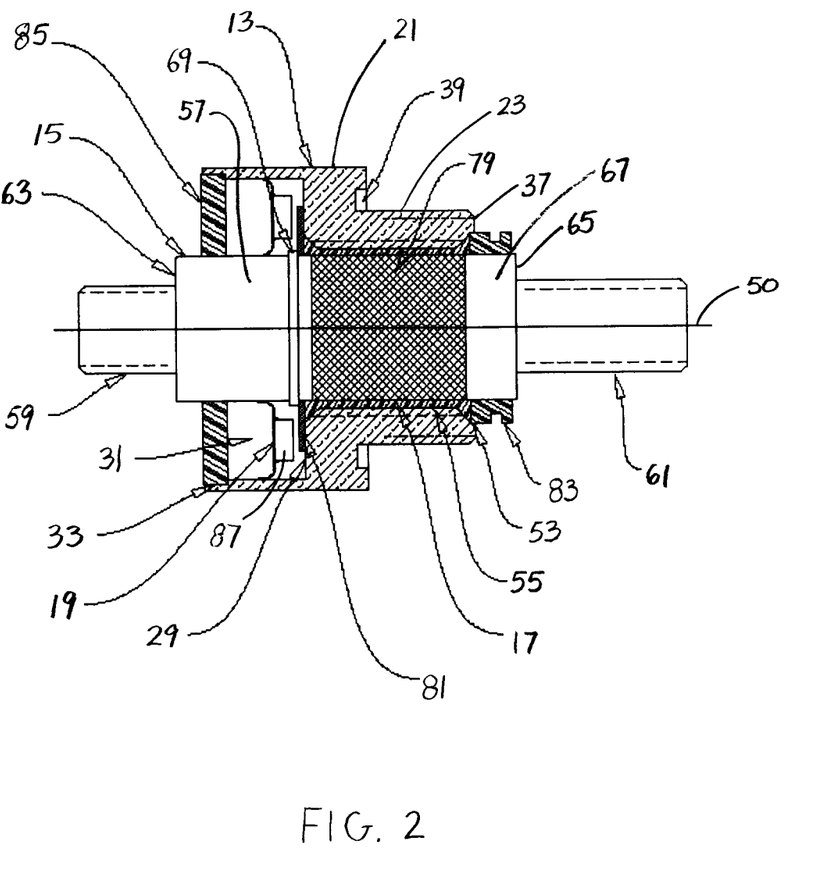
FIG. 2 is a section view of the feedthrough capacitor shown in FIG. 1, taken along lines 2-2, the feedthrough capacitor being shown without its fastening elements for ease of illustration.

As seen most clearly in FIGS. 1 and 2, feedthrough capacitor, or device, 11 comprises a grounded outer electrode 13, an inner electrode 15 extending coaxially within outer electrode 13, a layer of dielectric material 17 disposed between outer and inner electrodes 13 and 15, and a capacitor assembly 19 that is conductively coupled to each of outer and inner electrodes 13 and 15. As will be described further in detail below, the particular construction and functionality of capacitor assembly 19 provides feedthrough capacitor 11 with a number of notable advantages over traditional feedthrough capacitors and, as such, serves as a principal novel feature of the present invention.

Outer electrode, or mounting collar, 13 is a unitary conductive element that is preferably cast, forged or otherwise constructed from a rigid, durable and highly conductive material. As seen most clearly in FIGS. 2 and 3, outer electrode 13 comprises a widened, generally cylindrical housing 21 and a reduced diameter, hollowed stem 23 that are coaxially joined in an end-to-end relationship.

Figure 3:
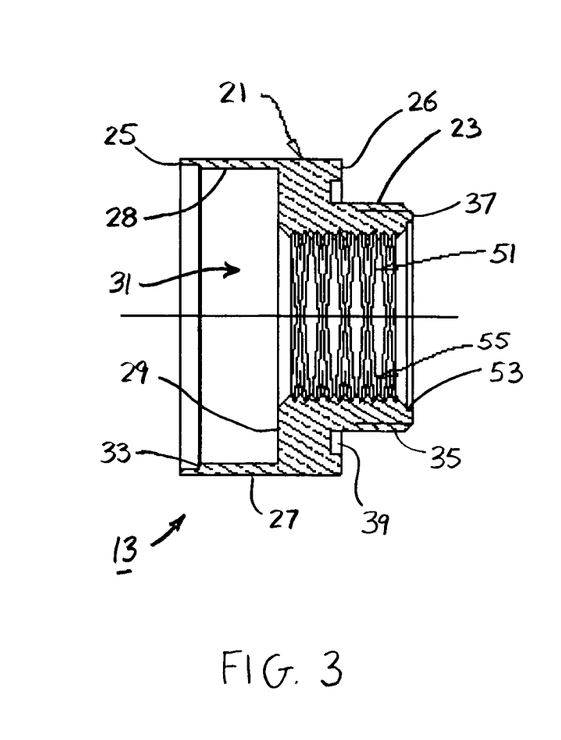
FIG. 3 is an isolated section view of the outer electrode shown in FIG. 2.

Widened cylindrical housing 21 includes an open first end 25, a partially enclosed second end 26, a rounded outer surface 27 and a rounded inner surface 28. An annular shelf, or face, 29 is integrally formed and projects radially inward from inner surface 28 at a location spaced suitably in from first end 25. Accordingly, it can be seen that open first end 25, rounded inner surface 28 and annular shelf 29 together at least partially define an enlarged cavity 31 that is dimensioned to receive both a segment of inner electrode 15 as well as capacitor assembly 19, as will be described further below.

A slight counterbore 33 is formed into housing 21 at open first end 25. In this manner, counterbore 33 defines a narrow, annular shelf that is adapted to receive an element for enclosing open first end 25 and, in turn, enlarged cavity 31, as will be described further below.

Reduced diameter stem 23 is integrally formed and extends orthogonally out from second end 26 of widened cylindrical housing 21 in a coaxial relationship relative thereto. Stem 23 comprises a threaded outer surface 35 and an open free end 37. An annular recess 39, generally rectangular in transverse cross-section, is formed into second end 26 of housing 21 about the immediate periphery of threaded outer surface 35 of stem 23, the function of recess 39 to become apparent below.

It is to be understood that the externally threaded construction of stem 23 enables outer electrode 13 to be easily mounted in metal chassis 12 of an electronic component using any combination of known fastening elements. For example, referring back to FIG. 1, stem 23 is dimensioned for near fitted insertion through a complementary hole 41 formed in metal chassis 12, with second end 26 of housing 21 disposed flush against outer surface 12-1 of chassis 12. An optional O-ring 43 is fittingly disposed within recess 39 if an adequate seal is required between outer surface 12-1 and housing 21.

To securely retain feedthrough capacitor 11 within chassis 12, a mounting nut 45 is axially threadingly mounted onto stem 23 and tightened so as to firmly abut against inner surface 12-2 of chassis 12, thereby compressing, or sandwiching, chassis 12 between the flange-like second end 26 of housing 21 and the flat top surface of mounting nut 45. An optional lockwasher 47 is preferably axially mounted onto stem 23 between nut 45 and chassis 12 to prevent unintentional loosening of mounting nut 45.

With feedthrough capacitor 11 mounted in the manner set forth above, it is to be understood that a reliable conductive path is established between mounting collar 13 and metal chassis 12. As a result, relatively high AC signals carried by inner electrode 13 are effectively bypassed to grounded chassis 12 through mounting collar 13. Although the entirety of chassis 12 is represented herein as metal, it is to be understood that only the portion of chassis 12 that immediately defines hole 41 needs to be constructed of a conductive material to provide low pass filtering capabilities.

To prevent axial rotation of feedthrough capacitor 11 within hole 41, at least one flattened region, or flat, 49 is preferably formed into threaded stem 23 along its length. As a result, stem 23 is effectively provided with a non-circular profile (e.g., elliptical) in transverse cross-section. By forming hole 41 in chassis 12 with a similar profile, a keyed relationship is created between stem 23 and chassis 12 that prevents rotation of feedthrough capacitor 11 about its longitudinal axis 50.

As seen most clearly in FIG. 3, a narrow, longitudinal bore 51 is formed into free end 37 of stem 23 and extends into communication with enlarged cavity 31. A slight counterbore 53 is formed into stem 23 at open free end 37 about the periphery of longitudinal bore 51, the function of counterbore 53 to become apparent below.

Longitudinal bore 51 is immediately defined by a grooved interior wall 55. Wall 55 is preferably created by forming both right hand and left hand grooves in a crisscross fashion to create a diamond-like pattern. One efficient method for forming the crisscross pattern of grooves into wall 55 is by forming right and left hand course threads (e.g., by use of right hand and left hand thread taps). However, it is to be understood that threading capabilities are not required in grooved interior wall 55 and, as such, could be eliminated without departing from the spirit of the present invention.

As seen most clearly in FIGS. 1 and 2, inner, or through, electrode 15 extends longitudinally through both bore 51 and cavity 31 in a coaxial relationship relative to outer electrode 13. As will be described further below, through electrode 15 serves as the lead for delivering current from a source to the electronic component.

Inner electrode 15 is preferably constructed of a highly conductive material that is suitable for carrying electromagnetic signals and is conductively isolated from outer electrode 13 by dielectric material 17, as will be described further below. Inner electrode 15 is preferably constructed as a unitary member that includes a widened inner section 57 and opposing, co-linear outer sections 59 and 61.

Inner section 57 of inner electrode 15 is constructed as solid, generally cylindrical member that includes a first end 63, a second end 65, and a rounded outer surface 67. Preferably, inner section 57 is dimensioned such that its outer diameter is slightly less that the diameter of longitudinal bore 51. As such, a narrow annular gap is defined between inner electrode 15 and outer electrode 13 into which dielectric material 17 is disposed.

An annular, outwardly protruding flange, or ridge, 69 is circumferentially formed on outer surface 67 of inner section 57 near the midpoint between first and second ends 63 and 65. As will be described further below, ridge 69 is provided to locate the axial position of inner electrode 15 relative to outer electrode 13.

Outer sections 59 and 61 extend orthogonally out from first and second ends 63 and 65, respectively, in a coaxial relationship relative thereto. In the present invention, each of outer sections 59 and 61 is represented as a reduced diameter post that is externally threaded about its length. In this capacity, outer sections 59 and 61 of inner electrode 15 can be attached to corresponding electrical conductors using various types and combinations of axially mounted fastening elements.

For instance, a wiring lug, bus bar or other similar connective element for a separate electrical conductor (not shown) can be conductively coupled to inner electrode 15 by disposing the connective element firmly in contact against first end 63 of inner section 57. The connective element is then held in place against first end 63 by a nut 71 axially mounted on outer section 59, as shown in FIG. 1. Accordingly, by tightening nut 71 on threaded outer section 59, the connective element for the electrical conductor can be compressed firmly between first end 63 and nut 71 to ensure that adequate conductive contact is maintained with inner electrode 15. A lockwasher 73, such as a spring, Belleville or toothed lockwasher, is preferably axially mounted on outer section 59 between first end 63 and nut 71 to prevent inadvertent loosening of nut 71.

Similarly, a wiring lug, bus bar or other similar connective element for another electrical conductor (not shown) can be coupled to inner electrode 15 by wedging the connective element tightly between first and second nuts 75-1 and 75-2 that are axially mounted on outer section 61. A lockwasher 77 is preferably axially mounted on outer section 61 between nuts 75 to increase the long-term reliability of the connection.

However, it should be noted that inner electrode 15 need not be limited in its attachment to lead line electrical conductors in either manner set forth above. In fact, inner electrode 15 need not even rely upon the combined use of externally threaded posts at its extreme ends and one or more axially mounted fastening elements. Rather, it is to be understood that alternative means for attaching inner electrode to complementary lead line conductors could be provided without departing from the spirit of the present invention. For example, an inwardly protruding, threaded bore could be formed into either first end 63 or second end 65, the threaded bore being dimensioned to mechanically receive a corresponding male connector and thereby establish electrical connection therebetween.

Referring now to FIG. 2, outer surface 67 of inner section 57 is provided with a roughened, or knurled, region 79 along a portion of its length. For reasons to become apparent below, roughened region 79 is preferably in the form of a diamond knurl to maximize the amount of exposed textured surface area. In addition, it should be noted that the particular length and location of knurled region 79 is selected so as to roughly align, or substantially oppose in a spaced relationship, with complementary grooved interior wall 55 in outer electrode 13 when feedthrough capacitor 11 is fully assembled.

The assembly of inner electrode 15 within outer electrode 13 is preferably achieved by inserting outer section 61 of inner electrode 15 in through open first end 25 of housing 21, axially through longitudinal bore 51 and out through open free end 37, as shown. Inner electrode 15 is inserted through outer electrode 13 until widened inner section 57 axially penetrates through longitudinal bore 51 such that knurled region 79 on inner electrode 15 generally aligns with grooved interior wall 55, as noted above.

A thin layer of dielectric material 17 is deposited between diamond knurled region 79 of inner electrode 15 and diamond grooved interior wall 55 of outer electrode 13. Preferably, dielectric material 17 is in the form of an epoxy-based potting material that serves to permanently bond inner electrode 15 to outer electrode 13. As can be appreciated, the non-conductive nature of material 17 serves to conductively isolate inner electrode 15 from outer electrode 13. In addition, it should be noted that the use of an epoxy-based potting material, which is relatively durable in nature, renders material 17 suitably able to absorb significant radial and axial forces applied to inner electrode 15 that would tend to crack or similarly damage a more fragile dielectric material used in place thereof, such as a ceramic dielectric.

It should be noted that the diamond texture formed in grooved interior wall 55 of outer electrode 13 and knurled region 79 of inner electrode 15 significantly increases the overall surface area of the epoxied contact region between inner electrode 15 and outer electrode 13. As a result, the mechanical retention between outer and inner electrodes 13 and 15 is rendered particularly resistant to both axial and rotational separation forces.

To assist in the epoxying process, an insulated washer 81 and an insulator 83 are preferably axially mounted onto inner section 57 of inner electrode 15. Specifically, as seen most clearly in FIG. 2, a flat insulated washer 81 constructed of any suitable insulating material, such as mica, is axially mounted onto inner section 75 directly inside outwardly protruding flange 69. Accordingly, as widened inner section 57 of inner electrode 15 is axially inserted through longitudinal bore 51, washer 81 is disposed flush, or wedged, against annular shelf 29 in outer electrode 13 by flange 69, thereby limiting further insertion of inner electrode 15. With washer 81 disposed as such, layer of dielectric material 17 is then injected between diamond knurled region 79 and grooved interior wall 55. As a result, it is to be understood that insulated washer 81 serves as, inter alia, (i) an epoxy barrier for retaining dielectric material 17 in place between region 79 and wall 55, (ii) a temporary alignment and positioning guide for ensuring that inner electrode 15 is disposed properly relative to outer electrode 13 while dielectric material 17 cures, and (iii) an item to protect against arc propagation.

With inner electrode 15 disposed in its proper position within longitudinal bore 51 in the manner set forth above, insulator 83 is axially mounted on second end 65 of inner section 57. As seen most clearly in FIG. 2, insulator 83 is then displaced inward along second end 65 until insulator 83 mates firmly within counterbore 53 in free end 37 of stem 23, the fitted frictional relationship between insulator 83 and inner electrode 15 retaining insulator 83 in place on second end 65 in the absence of a longitudinal displacement force applied thereto. As such, insulator 83 serves to not only prevent unintentional withdrawal of inner electrode 15 from outer electrode 13, which would result in the disassembly of feedthrough capacitor 11, but also assists in properly centering inner electrode 15 within outer electrode 13 while dielectric material 17 hardens.

To provide further structural support to feedthrough capacitor 11 and, in addition, assist in centering inner electrode 15 properly within outer electrode 13, an annular insulated cap 85 is axially mounted on first end 63 of inner section 57 in a fitted relationship relative thereto. As seen most clearly in FIG. 2, cap 85 is dimensioned to sit firmly within counterbore 33 in open first end 25 of housing 21. In this capacity, cap 85 serves to center inner electrode 15 within outer electrode and, in addition, enclose interior cavity 31.

Although feedthrough capacitor 11 is shown herein utilizing rigid, annular cap 85 to enclose interior cavity 31, it is to be understood that alternative means for enclosing interior cavity 31 could be implemented without departing from the spirit of the present invention. For instance, in place of annular cap 85, a non-conductive potting compound could be filled into interior cavity 31 to complete assembly of feedthrough capacitor 11. The assembly thus far described constitutes an electrical feed through device that is capable of handling high current but without substantial added capacitance.

As referenced briefly above, capacitor assembly 19 is conductively coupled to each of outer and inner electrodes 13 and 15. In use, capacitor assembly 19 enables DC signals and relatively low frequency AC signals to be carried by inner electrode 15 while, at the same time, bypassing relatively high frequency AC signals carried by inner electrode 15 to grounded chassis 12. As will be described further below, the particular construction and functionality of capacitor assembly 19 provides feedthrough capacitor 11 with a number of notable advantages and, as such, serves as a principal novel feature of the present invention.

Figure 4:
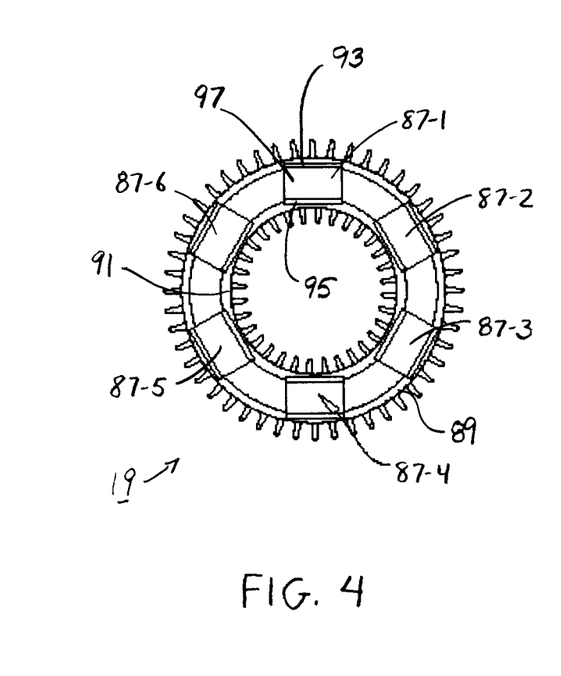
FIG. 4 is a right end view of the capacitor assembly shown in FIG. 2.

Referring now to FIGS. 2 and 4, capacitor assembly 19 is a unitary item that comprises a plurality of capacitors 87-1 thru 87-6 that are circumferentially arranged within interior cavity 31, an outer conductive element 89 connecting one terminal of each capacitor 87 to outer electrode 13, and an inner conductive element 91 connecting the other terminal of each capacitor 87 to inner electrode 15.

Each capacitor 87 is preferably in the form of a monolithic multilayer ceramic (MLC) capacitor that offers relatively low inductance, low resistance, and considerably high capacitance per unit volume, or volumetric efficiency. As seen most clearly in FIG. 4, each capacitor 87 includes a first conductive terminal 93, a second conductive terminal 95 and a layer of ceramic material 97 disposed between terminals 93 and 95 that are altogether compressed into a small block that can be readily surface mounted. As can be appreciated, because pretested, monolithic MLC capacitors 87 are utilized, the capacitance and temperature coefficient of each capacitor 87 is known with relative accuracy which, in turn, allows for greater filtering control and durability, which is highly desirable.

Capacitors 87-1 thru 87-6 are arranged in a circumferential array, with first terminal 93 of each capacitor 87 facing radially outward and second terminal 95 of each capacitor 87 facing radially inward. Although six separate capacitors 87 are represented herein, it is to be understood that a fewer or greater number of capacitors 87 could be utilized in assembly 19 without departing from the spirit of the present invention.

Outer and inner conductive elements 89 and 91 are concentrically arranged in a spaced apart relationship. Capacitors 87 are surface mounted on and permanently joined to each of outer conductive element 89 and inner conductive element 91 and, as a result, render capacitor assembly 19 a unitary item. Although not shown herein, it is to be understood that one or more non-conductive connective members could join outer and inner conductive elements 89 and 91 to provide additional structural integrity to capacitor assembly 19 as well as to provide greater ease in its construction. For example, a plurality of non-conductive radial ribs could extend between and join outer and inner conductive elements 89 and 91 without departing from the spirit of the present invention. As another example, outer and inner conductive elements 89 and 91 could be mounted on a common, non-conductive substrate without departing from the spirit of the present invention.

Figure 5:
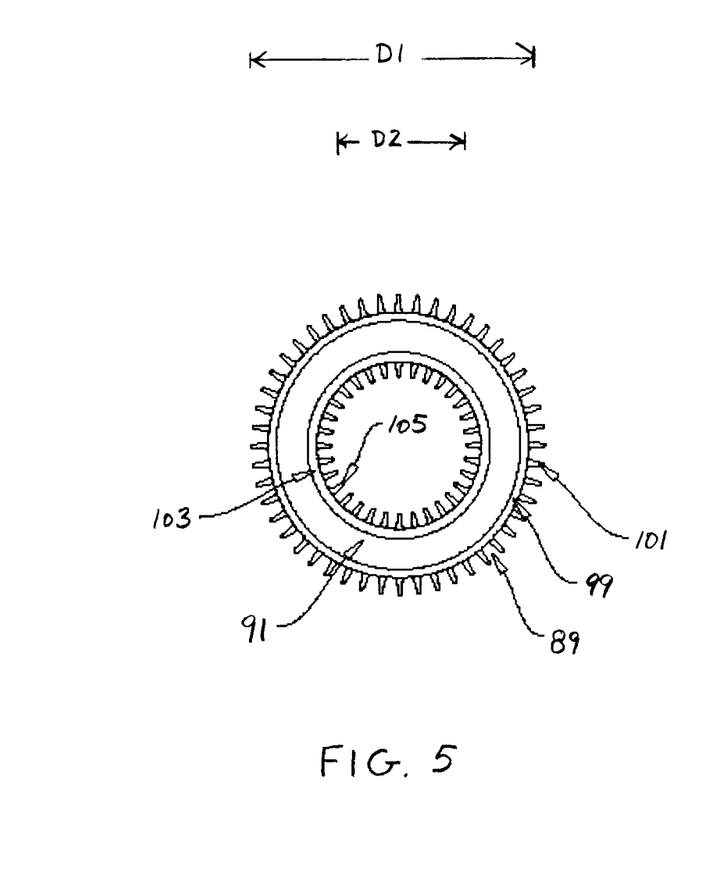
FIG. 5 is a right end view of the capacitor assembly shown in FIG. 2, the capacitor assembly being shown with the plurality of individual capacitors removed therefrom.

As seen most clearly in FIG. 5, outer conductive element 89 is a unitary member constructed of a flexible metallic material that includes a flattened ring 99 and a plurality of flexible fingers, or tines, 101 that project radially out from the periphery of ring 95.

Ring 99 is preferably widened and thickened to create a more rigid, or strengthened, surface on which generally each capacitor 87 is mounted. Specifically, as shown in FIG. 4, first terminal 93 of each capacitor 87 is positioned upon ring 99 and is preferably conductively secured thereto by any suitable means, such as through a soldering process, to ensure long-term electrical connection.

Flexible fingers 101 are represented herein as a plurality of thin, generally triangular prongs that are integrally formed onto the periphery of ring 99 in an equidistantly spaced apart relationship. As can be seen, fingers 101 project radially outward. For reasons to become apparent below, the tips of the plurality of fingers 101 together define a circle with a diameter D1 that is slightly greater than the inner diameter of cylindrical housing 21.

Inner conductive element 91 is similar to outer conductive element 89 in that inner conductive element 91 is a unitary member constructed of a flexible metallic material that includes a flattened ring 103 and a plurality of flexible fingers, or tines, 105. Inner conductive element 91 differs from outer conductive element 89 in that (i) ring 103 is smaller in diameter than ring 99 and (ii) tines 105 project radially in, rather than out, from ring 103.

Ring 103 is preferably similarly widened and thickened to create a more rigid, or strengthened, surface on which each capacitor 87 is mounted. Specifically, as shown in FIG. 4, second terminal 95 of each capacitor 87 is positioned upon ring 103 and is preferably conductively secured thereto by any suitable means, such as through a soldering process, to ensure long-term electrical connection.

Flexible fingers 105 are similarly represented herein as a plurality of thin, generally triangular prongs that are integrally formed onto ring 103 in an equidistantly spaced apart relationship. As noted above, fingers 105 project radially inward. For reasons to become apparent below, the tips of the plurality of fingers 105 together define a circle with a diameter D2 that is slightly less than the outer diameter of inner section 57 of inner electrode 15.

As part of the assembly process, capacitor assembly 19 is axially mounted onto inner section 57 of inner electrode 15, as shown in FIG. 2. With capacitor assembly 19 mounted as such, capacitors 87 are arranged within interior cavity 31 as a circumferential array around through conductor 15. Because the diameter D2 of the circle defined by the tips of tines 105 is less than the outer diameter of inner section 57, tines 105 flex, or bend, to the extent necessary to allow for the axial penetration of inner section 57 through inner conductive element 91, as seen most clearly in FIG. 6. In this capacity, the relatively small spacing between the plurality of tines 105 effectively forms a continuous electrical spring contact around the outer periphery of inner section 57 that, in turn, establishes a conductive bridge between through electrode 15 and second terminal 95 of each capacitor 87.

Figure 6:
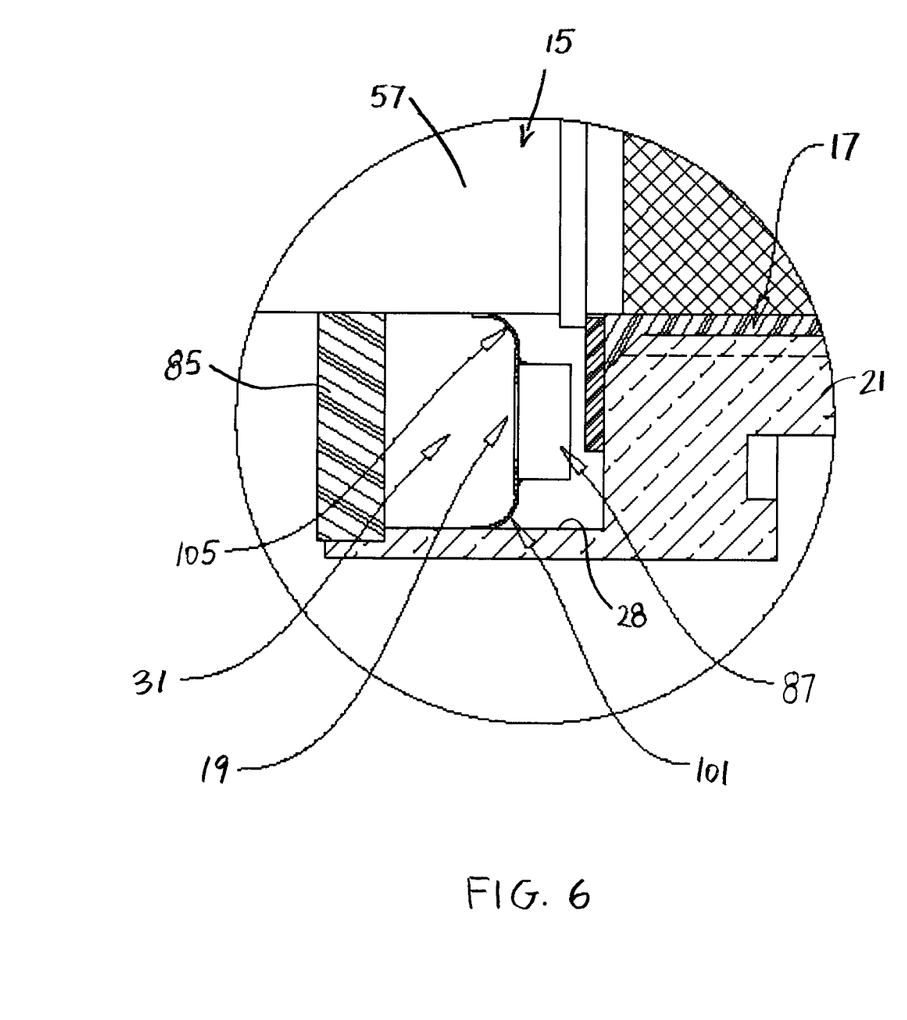
FIG. 6 is an enlarged, fragmentary view of the feedthrough capacitor shown in FIG. 2.

It should be noted that the deflection of tines 105 against inner section 57 creates a resiliency in the connection established therebetween. Furthermore, the large quantity of tines 105 creates a redundancy in the connection established between inner conductive element 91 and through electrode 15. As a result, a reliable connection is maintained between inner conductive element 91 and through electrode 15 even when considerable inter-component movement is experienced.

As capacitor assembly 19 is axially mounted onto inner section 57, tines 101 of outer conductive element 89 are similarly drawn into contact against inner surface 28 of housing 21. Because the diameter D1 of the circle defined by the tips of tines 101 is greater than the inner diameter of housing 21, tines 101 flex, or bend, to the extent necessary to allow for insertion of capacitor assembly 19 into cavity 31, as seen in FIG. 6. In this capacity, the relatively small spacing between the plurality of tines 101 effectively forms a continuous electrical spring contact against inner surface 28 of housing 21 that, in turn, establishes a connective bridge between outer electrode 13 and first terminal 93 of each capacitor 87.

Furthermore, it should be noted that the deflection of tines 101 against inner surface 28 creates a resiliency in the connection established therebetween. Furthermore, the large quantity of tines 101 creates a redundancy in the connection established between outer conductive element 89 and outer electrode 13. As a result, a reliable connection is maintained between outer conductive element 89 and outer electrode 13 even when considerable inter-component movement is experienced.

With capacitor assembly 19 mounted within enlarged cavity 31 in the manner set forth above, cap 85 is mounted within counterbore 33 to enclose first end 25. Although enlarged cavity 31 remains substantially empty even with capacitor assembly 19 disposed therein, it is to be understood that a potting or dielectric insulation material (not shown) could be packed into and substantially fill cavity 31 without departing from the spirit of the present invention.

As noted briefly above, the particular construction and functionality of capacitor assembly 19 provides feedthrough capacitor 11 with a number of notable advantages over traditional feedthrough capacitors (e.g., ceramic tubular feedthrough capacitors, ceramic discoidal feedthrough capacitors and polymeric film-type feedthrough capacitors).

As a first advantage, the resiliency of spring fingers 101 and 105 serves to effectively preserve continuous, reliable contact between capacitor assembly 19 and outer and inner electrodes 13 and 15, thereby rendering feedthrough capacitor 11 highly durable in nature.

As a second advantage, the particular construction of capacitor assembly 19 allows for greater design flexibility. For instance, it is to be understood the number, style and values of capacitors 87 could be modified to suit the needs for a particular application. In addition, the use of flexible tines 101 and 105 enables capacitor assembly 19 to accommodate slight variances in the dimensional aspects of outer electrode 13 and through electrode 15, respectively. Furthermore, the size and/or shape of conductive elements 89 and 91 could be modified, if necessary, to accommodate larger variances in the dimensional aspects of outer electrode 13 and through electrode 15.

As a third advantage, the use of small, pretested, monolithic MLC capacitors 87 provides feedthrough capacitor 11 with greater filtering accuracy and ease of assembly. In addition, the use of ceramic-based capacitors 87 provides feedthrough capacitor 11 with many of the advantageous characteristics associated with ceramic tubular feedthrough capacitors, such as relatively high capacitance, limited axial length and broad temperature range usability. However, at the same time, the redundancy and spring-biased connection of the plurality of monolithic MLC capacitors 87 as well as the use of an epoxy-based potting material 17 to mechanically support and electrically insulate outer and inner electrodes 13 and 15 renders feedthrough capacitor 11 considerably more durable than conventional ceramic tubular feedthrough capacitors that rely largely upon a single, relatively fragile, tubular ceramic dielectric for capacitance, structural support and electrical isolation.

As referenced briefly above, the particular construction of feedthrough capacitor 11 is intended to be merely exemplary and those skilled in the art shall be able to make numerous variations and modifications to it without departing from the spirit of the present invention. All such variations and modifications are intended to be within the scope of the present invention as defined in the appended claims.

For example, the principals of the present invention could be applied to alternative types of feedthrough devices without departing from the spirit of the present invention. In particular, feedthrough device 11 is represented herein as a feedthrough capacitor. However, it is to be understood that feedthrough device 11 could be modified to function as a feedthrough filter by adding a series inductor element.

Figure 7:
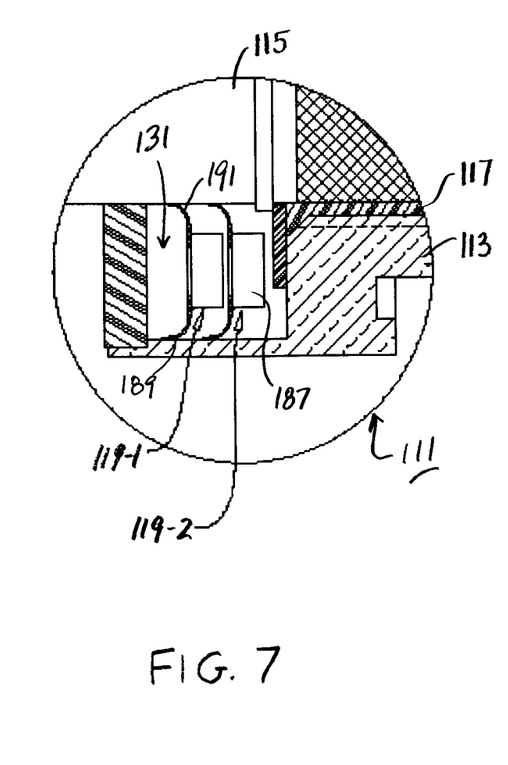
FIG. 7 is an enlarged, fragmentary section view of a second embodiment of a feedthrough capacitor constructed according to the teachings of the present invention.

As another example, referring now to FIG. 7, there is shown an enlarged, fragmentary, section view of a second embodiment of a feedthrough capacitor constructed according to the teachings of the present invention, the feedthrough capacitor being identified generally by reference numeral 111.

As can be seen, feedthrough capacitor 111 is similar to feedthrough capacitor 11 in that feedthrough capacitor includes a grounded outer electrode 113, an inner electrode 115 extending coaxially within outer electrode 113 and a layer of dielectric material 117 disposed between outer and inner electrodes 113 and 115.

Feedthrough capacitor 111 differs from feedthrough capacitor 11 in that feedthrough capacitor includes a pair of capacitor assemblies 119-1 and 119-2, rather than a single capacitor assembly, to bypass relatively high frequency AC signals carried by inner electrode 115 to ground. Each capacitor assembly 119 is preferably similar in construction to capacitor assembly 19 in that each capacitor assembly 119 is a unitary item that comprises a plurality of capacitors 187 that are circumferentially arranged, an outer conductive element 189 connecting one terminal of each capacitor 187 to outer electrode 113, and an inner conductive element 191 connecting the other terminal of each capacitor 187 to inner electrode 115.

Due to the unitary, ring-like construction of each capacitor assembly 119, it is to be understood that capacitor assemblies 119-1 and 119-2 can be easily axially mounted onto inner electrode 115 in a front-to-back, or stacked, arrangement. In fact, it is to be understood that additional capacitor assemblies 119 could be added, as needed, to capacitor assemblies 119-1 and 119-2 to provide even further signal filtering capabilities and redundancy, with the number of assemblies 119 utilized being limited solely by the depth of the interior cavity 131 defined by outer electrode 113.

What is claimed is:

1. A feedthrough device, comprising:
   (a) a grounded outer electrode shaped to define an enlarged interior cavity,
   (b) an inner electrode extending through the outer electrode, the inner electrode being adapted to carry electric current,
   (c) a dielectric material disposed between the outer and inner electrodes, and
   (d) a capacitor assembly for bypassing electric current carried by the inner electrode that falls above a predefined threshold to the grounded outer electrode, the capacitor assembly comprising,
      (i) one or more capacitors, each capacitor having a first terminal and a second terminal,
      (ii) a first array of spring fingers conductively coupled to the first terminal of each of the one or more capacitors, the first array of spring fingers being conductively coupled to the outer electrode, and
      (iii) a second array of spring fingers conductively coupled to the second terminal of each of the one or more capacitors, the second array of spring fingers being conductively coupled to the inner electrode.

2. The feedthrough device as claimed in claim 1 wherein the plurality of capacitors is disposed within the enlarged interior cavity and circumferentially arranged around the inner electrode.

3. The feedthrough device as claimed in claim 2 wherein each of the plurality of capacitors is in the form of a monolithic multilayer ceramic capacitor.

4. The feedthrough device as claimed in claim 2 wherein the capacitor assembly includes an outer conductive ring and an inner conductive ring that are concentrically arranged, the first terminal of each the plurality of capacitors being surface mounted onto the outer conductive ring and the second terminal of each of the plurality of capacitors being surface mounted onto the inner conductive ring.

5. The feedthrough device as claimed in claim 4 wherein the first array of spring fingers extends radially out from the outer conductive ring and is dimensioned to resiliently maintain direct inner circumferential contact against the outer electrode.

6. The feedthrough device as claimed in claim 5 wherein the second array of spring fingers extends radially in from the inner conductive ring and is dimensioned to resiliently maintain direct outer circumferential contact against the inner electrode.

7. The feedthrough device as claimed in claim 1 wherein the outer electrode is shaped to define a narrow longitudinal bore that extends in communication with the enlarged interior cavity.

8. The feedthrough device as claimed in claim 7 wherein the outer electrode includes an outer surface and an inner surface, the portion of the inner surface of the outer electrode that immediately defines the longitudinal bore including at least one groove.

9. The feedthrough device as claimed in claim 8 wherein the portion of the inner surface of the outer electrode that immediately defines the longitudinal bore includes a region with opposing left and right hand grooves that crisscross to form a diamond-like pattern.

10. The feedthrough device as claimed in claim 8 wherein the inner electrode includes a first section with a roughened outer surface along a portion of its length.

11. The feedthrough device as claimed in claim 10 wherein the roughened outer surface of the inner electrode is in the form of a diamond knurl.

12. The feedthrough device as claimed in claim 10 wherein the dielectric material adhesively joins the region with at least one groove in the outer electrode with the roughened outer surface of the inner electrode.

13. The feedthrough device as claimed in claim 12 wherein the dielectric material is in the form of a non-conductive, epoxy-based potting material that insulates and adhesively joins the inner and outer electrodes.

14. A feedthrough device, comprising:
  (a) a grounded outer electrode shaped to define an enlarged interior cavity,
  (b) an inner electrode extending through the outer electrode, the inner electrode being adapted to carry electric current,
  (c) a dielectric material disposed between the outer and inner electrodes, and
  (d) a capacitor assembly for bypassing electric current carried by the inner electrode that falls above a pre-defined threshold to the grounded outer electrode, the capacitor assembly comprising,
    (i) one or more capacitors, each capacitor having a first terminal and a second terminal, and
    (ii) a first array of spring fingers for conductively coupling one of the first and second terminals of each of the one or more capacitors to one of the outer and inner electrodes.

15. The feedthrough device as claimed in claim 14 further comprising a second array of spring fingers for conductively coupling the other of the first and second terminals of each of the one or more capacitors to the other of the outer and inner electrodes.

16. A device, comprising:
  (a) a grounded outer electrode having an outer surface and an inner surface, the outer electrode being shaped to define an enlarged interior cavity and a narrow longitudinal bore that extends in communication with the enlarged interior cavity,
  (b) an inner electrode extending through the outer electrode, the inner electrode being adapted to carry electric current, and
  (c) a dielectric material disposed between the outer and inner electrodes,
  (d) wherein the portion of the inner surface of the outer electrode that immediately defines the longitudinal bore includes a region with opposing left and right hand grooves that crisscross to form a diamond-like pattern.

17. The device as claimed in claim 16 wherein the inner electrode includes a first section with a roughened outer surface along a portion of its length.

18. The device as claimed in claim 17 wherein the roughened outer surface of the inner electrode is in the form of a diamond knurl.

19. The device as claimed in claim 17 wherein the dielectric material adhesively joins the region with opposing left and right hand grooves in the outer electrode with the roughened outer surface of the inner electrode.

20. The device as claimed in claim 19 wherein the dielectric material is in the form of a non-conductive, epoxy-based potting material that insulates and adhesively joins the inner and outer electrodes.

* * * * *